Nov. 25, 1969      I. D. PRESS      3,480,707
PRODUCTION OF P.T.F.E. TUBING
Filed Oct. 7, 1965      2 Sheets-Sheet 1
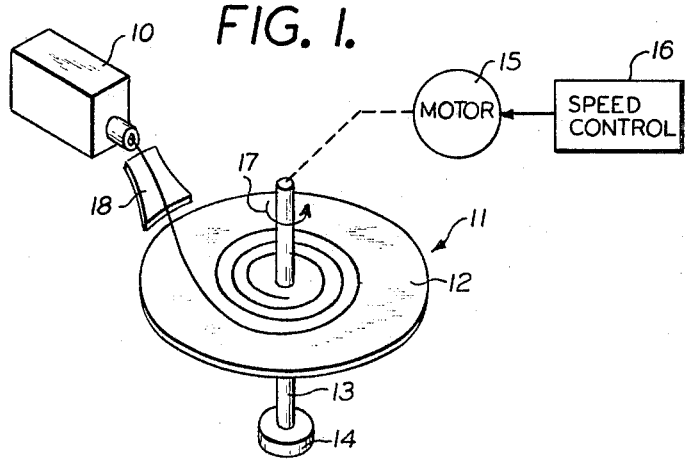
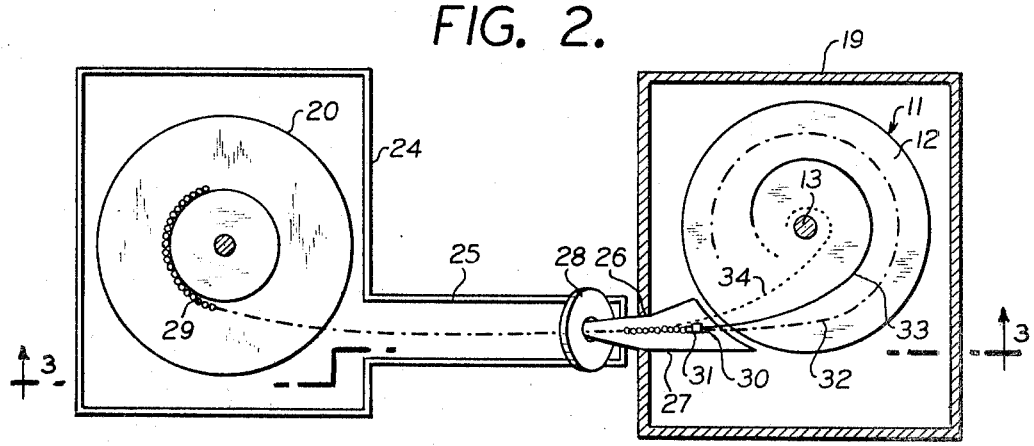
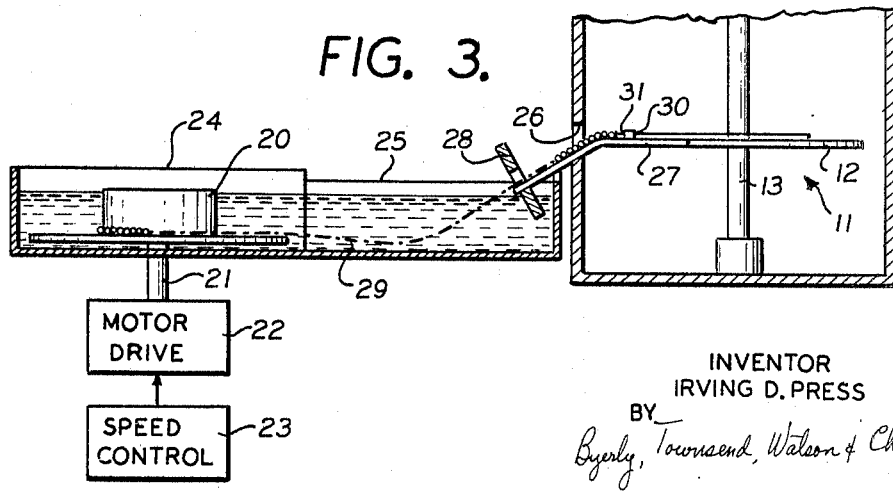
INVENTOR
IRVING D. PRESS
BY Byerly, Townsend, Watson & Churchill
ATTORNEYS.

United States Patent Office 3,480,707
Patented Nov. 25, 1969

3,480,707
PRODUCTION OF P.T.F.E. TUBING
Irving D. Press, West Orange, N.J., assignor to Resistoflex Corporation, Roseland, N.J., a corporation of New York
Filed Oct. 7, 1965, Ser. No. 493,698
Int. Cl. B29d 23/01, 23/04
U.S. Cl. 264—209                                9 Claims

ABSTRACT OF THE DISCLOSURE

Unsintered P.T.F.E. resin in paste form is extruded directly upon the periphery of a spiral ramp which is rotated in front of the mouth of the extruder and translated axially relative thereto. While so supported, the unsintered tubing on the rack is placed within an oven and sintered. The tubing is then withdrawn from the rack as the rack is positively driven in step with the rate of withdrawal, the tubing being withdrawn through the wall of the oven directly into a quenching trough and onto a take-up drum or reel.

---

The present invention relates to a process for producing extruded articles, and particularly but not necessarily tubing from polytetrafluoroethylene (hereinafter abbreviated P.T.F.E.) resin and to apparatus for use in connection therewith.

A major use for P.T.F.E. resin is in the fabrication of tubing for flexible hose lines. Commercial production presently utilizes a paste mixture of P.T.F.E. resin and a volatilizable liquid extrusion aid, the mixture being extruded in tubular form, then heated to drive off the extrusion aid and sinter the resin, and, finally quenched. Prior to the present invention no practical procedure was known for carrying out the foregoing steps with long lengths of tubing. For example, in one process lengths up to about 25 ft. are extruded, placed in pipes, and supported thereby in elongated hot air ovens for heating and sintering. Quenching is accomplished by transferring the pipe along with the sintered tubing from the oven into a quenching tank. Practical limitations on the lengths of the oven and the pipes determine the maximum length of tubing that can be produced.

In the actual manufacture of hose from P.T.F.E. tubing the quality and performance of the finished product is dependent upon numerous factors. Two such factors are the dimensional control maintained on the tubing as well as its crystallinity. The best tolerance control maintainable on the outer diameter of tubing produced by the known process described above is from .010 to .015 inch. The outer diameter of the tubing is significant when braiding or spiral wrapping an external reinforcing layer.

In spiral wrapping, the tubing normally is placed upon a mandrel from which it must be withdrawn after the spiral wrap is applied. Generally, due to the inherent nature of the process, the wall thickness of the tube will remain essentially constant. Hence, if the outer diameter is permitted to vary, the inner diameter will vary accordingly. It will thus be appreciated that adherence to close tolerances is required in order that the tubing will make a snug but not too tight fit on the mandrel when a spiral wrap is applied.

In connection with braiding an external reinforcing layer, it will be appreciated that the angle of the braid will vary with change in the diameter of the tubing. The strength of the braid is a function of the braid angle. Hence, more uniform and stable strength characteristics can be obtained with more uniform and constant tubing dimensions.

An object of the present invention, therefore, is to produce more uniform tubing. It has been found that the process to be described enables tubing to be produced with a tolerance on the outer diameter of from .003 to .005 inch.

Another object of the present invention is to produce continuous long lengths of tubing or other articles limited essentially only by the capacity of the extruding equipment.

A still further object of the invention is to provide a process whereby the minimum crystallinity is obtainable in the production of P.T.F.E. tubing or other articles.

The new process according to the present invention includes the steps of coiling lengths of unsintered extruded P.T.F.E. resin into an open spiral and sintering said lengths of resin while so coiled. It also includes the steps of heating coiled lengths of resin to sintering temperature and quenching the resin while uncoiling it. In the carrying out of the process special apparatus is required giving rise to additional aspects of the present invention.

The invention will be better understood after reading the following detailed description thereof with reference to the appended drawings wherein:

FIGURE 1 is a diagrammatic illustration of one form of apparatus for use in the extrusion phase of the present invention;

FIGURE 2 is a diagrammatic plan view of equipment for sintering and quenching the tubing extruded with the apparatus of FIGURE 1;

FIGURE 3 is a cross-section, also diagrammatic, taken along line 3–3 in FIGURE 2;

Figure 4:
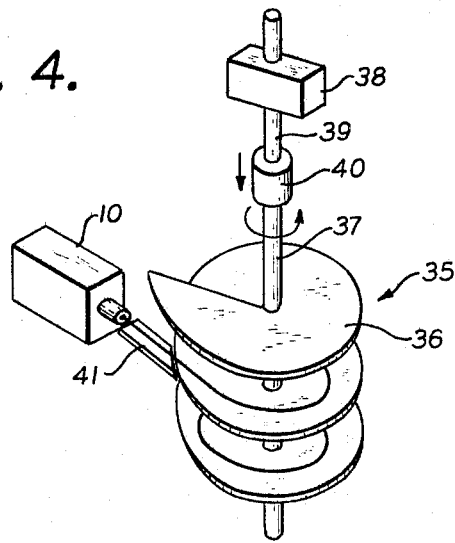
FIGURE 4 is a diagrammatic illustration of another form of apparatus for practicing the extrusion phase of the present invention.

For convenience, the following description will be restricted to the manufacture of tubing but it will be understood that the process and apparatus can be applied to the manufacture of long lengths of extruded rods and shapes other than tubing.

Referring to FIGURE 1, there is shown, generally at 10, a conventional extruder for use in the extrusion of P.T.F.E. paste. A special rack 11 is mounted adjacent to the mouth of the extruder, as shown. The rack 11 consists essentially of a flat circular plate 12 mounted on a vertical shaft 13 which is journaled in bearings, such as the one shown at 14. An electric motor 15 having a speed control 16 is coupled mechanically to the shaft 13 for rotating the rack 11 in the direction shown by the arrow 17. A supporting bridge 18 is placed between the rack 11 and the extruder 10.

When it is desired to extrude a length of tubing the operator will first start the extruder causing the leading end of the extrudate to pass along the bridge 18 and onto the plate 12 until it approaches its center. At this time he will start the motor 15 causing rotation of the rack 11 and controlling its speed so that the extrudate is coiled upon the rack in a loose spiral as it leaves the extruder. The spacing between turns of the coil will depend upon the size of the tubing being extruded and by factors which will be mentioned below in discussing the sintering steps.

After the rack 11 is fully loaded it can be transported with the extruded tubing thereon into an oven 19 as seen in FIGURES 2 and 3. While not shown, an appropriate speed controlled motor drive for rotating the rack 11 is provided in association with the oven.

Located externally of the oven is a take-up reel 20 mounted for driven rotation about a vertical axis 21 by a motor 22 under control of a speed control 23. The reel 20 is mounted in a tank 24 provided with a trough 25 extending laterally therefrom. The depth of the tank 24 and trough 25 should be sufficient to completely submerge the reel 20 in the quenching medium, e.g., water, as best seen in FIGURE 3.

The oven 19 is provided with an aperture 26 in the wall thereof adjacent the end of the trough 25. A support or bridge 27 is mounted in aperture 26 with one end adjacent the periphery of the rack plate 12. The other end of the support 27 should extend into the trough 25 a short distance below the water level. A water-spray ring 28 is shown adjacent the external end of the support 27. The angle or slope of the support 27 as it passes through the ring 28 and into the water in the trough 25 is, preferably, as slight as possible. This angle has been exaggerated in the drawing for convenience in illustration.

When the rack 11 with the extruded tubing thereon is installed in the oven 19 a flexible leader 29 is connected from the reel 20 to the free end of the extruded tubing which is brought out onto the support 27 to the point 30. A swivel connection 31 should be used in joining the tubing to the leader. The leader 29 may take the form of a beaded chain or the like.

With the extruded tubing so installed the oven can be turned on so as to proceed through the normal sintering cycle. At the start of the heating phase, the outermost turn of the tubing may occupy the position shown by the dot dash line 32. However, as extruded P.T.F.E. tubing is heated to drive off the volatilizable extrusion aid and to sinter the resin the tubing will shrink longitudinally. It will be found that this will result in the tubing "tightening" its coils on the rack 11. When the sintering phase is complete it will be found that the outermost turn of the tubing occupies a new position such as, for example, that shown by the reference numeral 33. In the process of drawing radially inward the tubing tends to roll. Hence, the desirability of having a swivel, such as 31, connecting the tube end to the leader. This will avoid any possibility of introducing stress to the tubing.

When sintering is complete, but while the oven is still at sintering temperature, the motor drives for both the reel 20 and the rack 11 may be started simultaneously. The speed of one or both may be controlled in order to maintain uniform tension on the tubing. If the rack 11 is rotating too fast, it will cause the tubing to buckle and ride off the support 27. If the reel 20 is too fast it will cause the tubing on the rack to tend to pull in and tighten its coils. Both of these effects are objectionable.

As the tubing leaves the oven still above its gel point it passes immediately through the water jet provided by the water-spray ring 28 and into the quench water in the trough 25. It should be readily apparent that by means of the apparatus shown in FIGURES 2 and 3 it is possible to maintain an extremely uniform and rapid quenching rate upon the tubing.

It has been found advisable to arrange the path of travel of the tubing through the spray ring 28 as near normal to the plane of the spray provided thereby as possible. In addition, the length of trough 25 should be selected preferably so that the tubing approaches room temperature before reaching the take-up reel 20.

As the tubing uncoils from the rack 11, the point at which it leaves the plate 12 will gradually move along its periphery towards the dashed line 34. In order to accommodate this movement the support 27 should be provided with a broad end, as shown.

Figure 5:
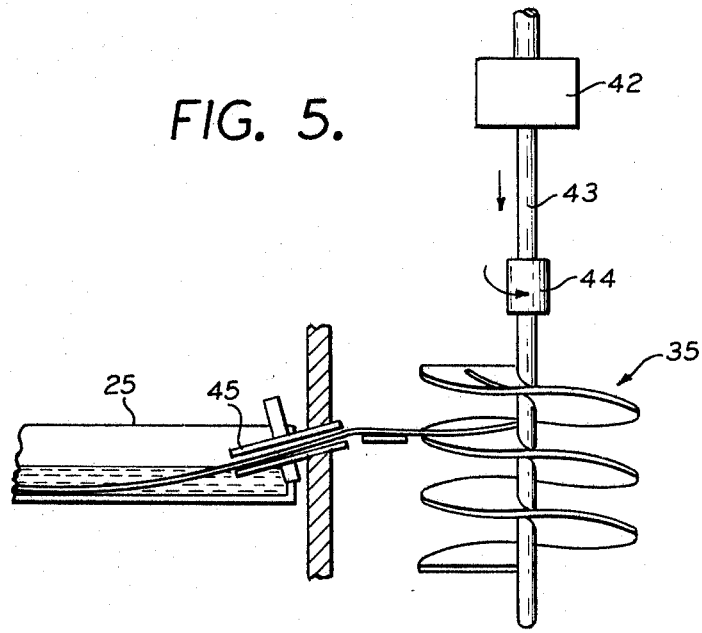
FIGURE 5 illustrates diagrammatically the equipment for sintering and quenching tubing extruded with the aid of the equipment shown in FIGURE 4.

While a rack such as 11 having a single horizontal plane supporting surface is useful under certain circumstances, it will be found more advantageous to employ a helical rack such as that shown generally at 35 in FIGURES 4 and 5. The helical rack 35 is provided with a spiral ramp 36 supported by a vertical shaft 37. Referring to FIGURE 4, any known mechanism 38 capable of simultaneously rotating and translating a shaft or tubular member 39 may be mounted above a point in front of the extruder 10. For example, the shaft 39 may be threaded internally and ride on an externally threaded core rod, and means may be provided for rotating the shaft 39 while the core rod is kept stationary. The lead of the threads on the core rod and shaft 39 should match that of the ramp.

For convenience, the end of the shaft 39 may be provided with a chuck or adjustable jaw device 40 for releasably engaging the upper end of the shaft 37. The longitudinal feed of the mechanisms 38 and 39 should be directly related to the lead of the spiral ramp 36 so that its periphery traverses a point adjacent the mouth of the extruder 10. A suitable bridge support 41 may be disposed between the mouth of the extruder and the edge of the ramp 36.

Prior to commencement of extrusion, the rack 35 may be located at its highest point. As previously described, the extruder 10 is first started until the extrudate reaches a suitable point on the lowermost flight of the ramp 36. The rack 35 is then placed in operation with its speed controlled by means not shown in order to deposit the tubing near the radially outer periphery of the rack. The width of the ramp must be chosen to allow for the tightening of the tubing helix as the extrusion aid evaporates and the tubing is sintered.

After the rack is loaded it can be placed in an oven arranged as shown in FIGURE 5. Drive mechanism 42, shaft 43, and chuck 44 are provided in association with the oven and are similar to the components 38, 39 and 40, respectively. The oven and quenching trough may be similar to that described above in connection with FIGURES 2 and 3. One modification shown in FIGURE 5 is the provision of a spray tube 45 rather than the short spray ring 28. The tube 45 should be angled into the trough 25 so as to prevent quenching fluid from entering the oven. Again, however, this angle is preferably as slight as possible. The general procedure for sintering the tubing and removing it from the oven will be substantially the same as that described with reference to FIGURES 2 and 3. The relative speed of rotation of the rack 35 during uncoiling of the helix should be matched to the speed of the take-up reel, not shown, so as to avoid buckling or stretching of the tubing.

While a horizontal take-up reel has been illustrated in FIGURES 2 and 3, it is also possible to utilize a vertical reel or drum.

As shown in FIGURES 4 and 5, that end of the tubing which is first extruded is the end which is first removed from the oven. However, this relation is not essential.

While the helical rack is shown in FIGURES 4 and 5 as consisting of a ramp supported by a central shaft, it will be obvious that the shaft may be replaced by any convenient structure for mounting the ramp for rotation.

The invention has been described with reference to certain presently preferred embodiments thereof. It will be understood by those skilled in the art that changes may be made therein without departing from its true spirit.

I claim:

1. In the process for producing tubing from a paste mixture of P.T.F.E. resin and a volatilizable liquid extrusion aid wherein the mixture is extruded in tubular form, heated in an oven to drive off the extrusion aid and sinter the resin, and then quenched, the steps of coiling the tubing into an open spiral as it leaves the extruder, supporting the tubing in the spiral condition so as to permit radial contraction of the coils and sintering it above its gel point while maintaining the support and permitting said contraction, uncoiling the sintering tubing while it is still above its gel point, and quenching the substantially straight running end of the tubing as it leaves the coil.

2. In the process of producing tubing from a paste mixture of P.T.F.E. resin and a volatilization liquid extrusion aid wherein the mixture is extruded in tubular form, heated in an oven to drive off the extrusion aid and sinter the resin, and then quenched, the steps of coiling the tubing into an open spiral as it leaves the extruder, supporting the tubing in the spiral condition so as to permit radial contraction of the coils and sintering it above its gel point while so supported and permitting said contraction, uncoiling the sintered tubing while it is still above its gel point by simultaneously rotating the coil to pay it out and withdrawing the free end, and quenching the substantially straight running end of the tubing as it leaves the coil.

3. In the process for producing tubing from a paste mixture of P.T.F.E. resin and a volatilizable liquid extrusion aid wherein the mixture is extruded in tubular form, heated in an oven to drive off the extrusion aid and sinter the resin, and then quenched, the steps of coiling the tubing into an open flat spiral as it leaves the extruder with sufficient space between adjacent turns to permit uninhibited radial contraction during sintering, supporting the tubing in the open spiral condition upon a rack having a horizontal plane surface, sintering the tubing above its gel point while so supported and permitting said contraction, uncoiling the sintered tubing while it is still above its gel point by simultaneously withdrawing its radially outer end and independently rotating the rack about a central vertical axis so as to maintain uniform tension on the tubing, and quenching the substantially straight running end of the tubing as it leaves the coil.

4. In the process for producing tubing from a paste mixture of P.T.F.E. resin and a volatilizable liquid extrusion aid wherein the mixture is extruded in tubular form, heated in an oven to drive off the extrusion aid and sinter the resin, and then quenched, the steps of coiling the tubing into a helix as it leaves the extruder, supporting the tubing in the helical condition upon a rack having a spiral ramp so as to permit uninhibited radial contraction of the coils during sintering, sintering the tubing above its gel point while so supported and permitting said contraction, uncoiling the sintered tubing while it is still above its gel point by simultaneously withdrawing one end thereof and independently rotating the rack about a central vertical axis so as to maintain uniform tension on the tubing, and quenching the substantially straight running end of the tubing as it leaves the coil.

5. In the process of producing an extruded article from P.T.F.E. resin the steps of coiling an extruded length of said resin into an open flat spiral, supporting the length of resin in the spiral condition upon a rack having a horizontal plane surface, heating the coiled length of resin to sintering temperature while on the rack, and quenching the length of resin by uncoiling it from the rack while above its gel point and introducing it in straight form directly into a quenching medium.

6. In the process of producing an extruded article from P.T.F.E. resin the steps of coiling an extruded length of said resin into a helix, supporting the length of resin in the helical condition upon a rack having a spiral ramp, heating the coiled length of resin to sintering temperature while on the rack, and quenching the length of resin by uncoiling it from the rack while above its gel point and introducing it in straight form directly into a quenching medium.

7. In the process of producing tubing from P.T.F.E. resin the steps of extruding a paste mixture of said resin and a volatilizable liquid extrusion aid in tubular form onto a rotating spiral ramp having sufficient width to accommodate the uninhibited radial contraction during sintering of said extruded mixture from its initial point of deposit, the speed of rotation of said ramp being controlled so as to deposit said tubing near the radially outer margins of said ramp, transporting said ramp with the tubing thereon into an oven, securing a flexible leader to one free end of said tubing with the leader passing through an aperture in the oven wall, raising the temperature in the oven to sintering temperature and sintering the tubing while supported on the ramp and permitting radial contraction, simultaneously applying tension to said leader and directly rotating said ramp so as to simultaneously pay out and withdraw said tubing from the oven without unduly stressing said tubing and passing said leader and said tubing through a quenching medium as soon as they leave the oven with the tubing being maintained substantially straight from the time it enters the quenching medium until its temperature has been reduced appreciably below its gel point.

8. In the process of claim 7, the further step of securing said leader to said tubing in a manner permitting uninhibited twisting of the tubing during sintering.

9. In the process of claim 7 the further steps of translating the spiral ramp along its axis as a function of the ramp lead both when depositing the tubing thereon and when removing it therefrom such that the horizontal level at which the tubing is deposited on and removed from the ramp remains substantially fixed.

References Cited

UNITED STATES PATENTS

| | | | |
|---|---|---|---|
| 3,225,129 | 12/1965 | Taylor et al. | 264—230 |
| 2,167,971 | 8/1939 | Cadden. | |
| 2,499,397 | 3/1950 | Lyon | 264—210 |
| 2,627,083 | 2/1953 | Witthoft. | |
| 2,710,991 | 6/1955 | Barrington et al. | 264—127 |
| 2,938,234 | 5/1960 | Slade | 264—127 |
| 2,889,581 | 6/1959 | Vanderhoof | 264—127 |

OTHER REFERENCES

"Paste Extrusion" from Modern Plastics, February 1956, pp. 115–126, by Thompson and Stabler.

ROBERT F. WHITE, Primary Examiner

J. R. THURLOW, Assistant Examiner

U.S. Cl. X.R.

18—14; 264—127, 210, 295